United States Patent [19]

Petruchik

[11] Patent Number: 5,541,690
[45] Date of Patent: Jul. 30, 1996

[54] HALF-FRAME FILM METERING

[75] Inventor: Dwight J. Petruchik, Honeoye Falls, N.Y.

[73] Assignee: Eastman Kodak Company, Rochester, N.Y.

[21] Appl. No.: 345,157

[22] Filed: Nov. 28, 1994

[51] Int. Cl.$^6$ .................................................. G03B 17/02
[52] U.S. Cl. .................................................. 354/159
[58] Field of Search .................................. 354/159, 110, 354/215, 218

[56] References Cited

U.S. PATENT DOCUMENTS

| | | | |
|---|---|---|---|
| 1,690,673 | 11/1928 | Forst | 354/159 |
| 1,991,924 | 2/1935 | Dolan | 95/36 |
| 2,233,238 | 2/1941 | Baumgartner | 95/32 |
| 2,351,999 | 6/1944 | Nerwin | 95/31 |
| 2,906,183 | 9/1959 | Rochwite | 354/215 |
| 3,815,970 | 6/1974 | Murphy | 95/18 R |
| 4,092,655 | 5/1978 | Ross | 354/124 |
| 4,140,381 | 2/1979 | Douglas | 354/111 |
| 4,716,427 | 12/1987 | Shyu | 354/159 |
| 5,049,908 | 9/1991 | Murakami | 354/173.1 |
| 5,210,557 | 5/1993 | Kameyama et al. | 354/120 |
| 5,235,366 | 10/1993 | Kucmerowski | 354/212 |
| 5,361,108 | 11/1994 | Kamata et al. | 354/120 |

FOREIGN PATENT DOCUMENTS 6-35125  2/1994  Japan .

*Primary Examiner*—David M. Gray
*Assistant Examiner*—Christopher E. Mahoney
*Attorney, Agent, or Firm*—Roger A. Fields; J. Addison Mathews

[57] ABSTRACT

A camera includes a film metering mechanism that controls longitudinal movement of the film for half-frame exposures. Film movement alternates between a first distance and a second distance greater than the first distance. The first distance defines abutting pairs of exposure frames and the second distance defines a space between adjacent frame pairs. According to more specific features, film movement is controlled by a cam that includes a first section defining the first distance and a second longer section defining the second distance. Still more specifically, the cam is circular, is driven by the film movement, and includes opposed asymmetric lobes, one for the first distance and the other for the second distance. Each frame pair defines a size equal to a standard 35 mm exposure, and the space between pairs also equals the 35 mm standard. The paired frames can be printed in standard equipment without special handling or procedures.

8 Claims, 4 Drawing Sheets

HALF-FRAME FILM METERING

CROSS REFERENCE TO RELATED APPLICATIONS

Reference is made to commonly assigned, copending U.S. patent application Ser. No. 08/228,763, entitled Sprocket Wheel For Camera, filed Apr. 18, 1994, in the name of Thomas E. Dussinger.

BACKGROUND OF THE INVENTION

1. Field of Invention

The invention relates to the field of photography, and more specifically to cameras, methods of advancing film, and film metering devices, particularly for half-frame exposures.

2. Description of the Prior Art

A typical mechanism for metering film is exemplified by a commercially available single use camera. The film is advanced by a thumb wheel to move sequentially, one frame after another, across an exposure plane between supply and take-up chambers. The metering mechanism includes a sprocket wheel and coaxial cam that are driven by perforations along an edge of the film to rotate the cam one revolution for each exposure frame. The cam controls a metering lever that pivots into a notch in the cam when the film is properly positioned for the next exposure. An opposed arm on the metering lever then moves against teeth on the edge of the thumb wheel, preventing further movement of the film until the mechanism is released during the next exposure sequence. An exposure is initiated by releasing a latch that constrains a high energy striker. The striker drives a shutter blade open, pivots the metering lever from the cam notch, and releases the thumb wheel and film for advancement of the next frame. A single use camera of this type is described, for example, in U.S. Pat. No. 5,235,366, issued Aug. 10, 1993.

It also is known to provide camera mechanisms with metering devices suitable for half-frame exposures. Shyu U.S. Pat. No. 4,716,427, issued Dec. 29, 1987, is one example having alternative settings for full and half-frames. The settings adjust Opaque plates in the viewfinder and exposure box. The film metering mechanism uses a wheel with two depending pins, one longer than the other, that rotate with the wheel when the film is advanced. When the camera is set for a full frame exposure, the long pin controls a complete revolution of the wheel, which meters a full film frame into the exposure position. When set for half-frame exposures, both pins are used, limiting rotation of the wheel to half revolutions between exposures, and reducing film movement between exposures to to an amount suitable for half-frames.

Still other cameras expose multiple images in the same area normally covered by a full frame. Murphy U.S. Pat. No. 3,815,970, issued Jun. 11, 1974, is an example disclosing two optical systems that focus images on the film in stereo pairs. The paired images are aligned in abutting relationship along their adjacent edges.

PROBLEM SOLVED BY THE INVENTION

Prior art cameras for making half-frame exposures are relatively complicated, with many special components. They are not suitable for applications requiring few and inexpensive parts, such as single use cameras. Similarly, existing approaches are not appropriate for easy conversion of inexpensive full frame cameras to half-frame applications. This is a significant fault, since half-frame applications do not presently support the volumes required to provide the quality and features expected today even in an inexpensive camera.

Existing half-frame exposures require special handling when they are printed. A single exposure is smaller than the standard 35 mm size, while two adjacent exposures are larger than the 35 mm standard. Even when camera price is not a driving factor, prints may be difficult to obtain. As already noted, the existing market is small, and photofinishers are not enthusiastic about implementing special procedures for few and infrequent orders.

SUMMARY OF THE INVENTION

The present invention is directed to overcoming one or more of the problems set forth above. Briefly summarized, according to one aspect of the invention, longitudinal movement of the film, defining successive exposure frames, alternates between a first distance and a second distance greater than the first distance. The first distance defines pairs of exposure frames and the second distance defines a space between adjacent pairs. According to more specific features, such film movement is controlled by a cam that includes a first section defining the first distance and a second longer section defining the second distance. Still more specifically, the cam is rotated by film movement, and includes opposed asymmetric lobes, one for the first distance and the other for the second distance. A coaxial cam controls the setting or resetting of various camera functions in accordance with the asymmetrical film movement, and an indicator is provided, visible from the camera exterior, representing which exposure is next in the pair.

According to a particularly advantageous feature, adjacent exposure frames overlap along one edge, defining an exposure pair, but each pair is spaced from adjacent pairs. Each pair defines a size equal to a standard 35 mm exposure, and the space between pairs also equals the 35 mm standard. The paired frames can be printed in standard equipment without special handling or procedures.

The invention is particularly adapted for use in an inexpensive camera that uses most of the same parts as a corresponding full frame camera. Conversion includes only substitution of the metering cam and suitable masks for the viewfinder and exposure box.

These and other features and advantages of the invention will be more clearly understood and appreciated from a review of the following detailed description of the preferred embodiments and appended claims, and by reference to the accompanying drawings.

DESCRIPTION OF THE PREFERRED EMBODIMENTS

Figure 1:
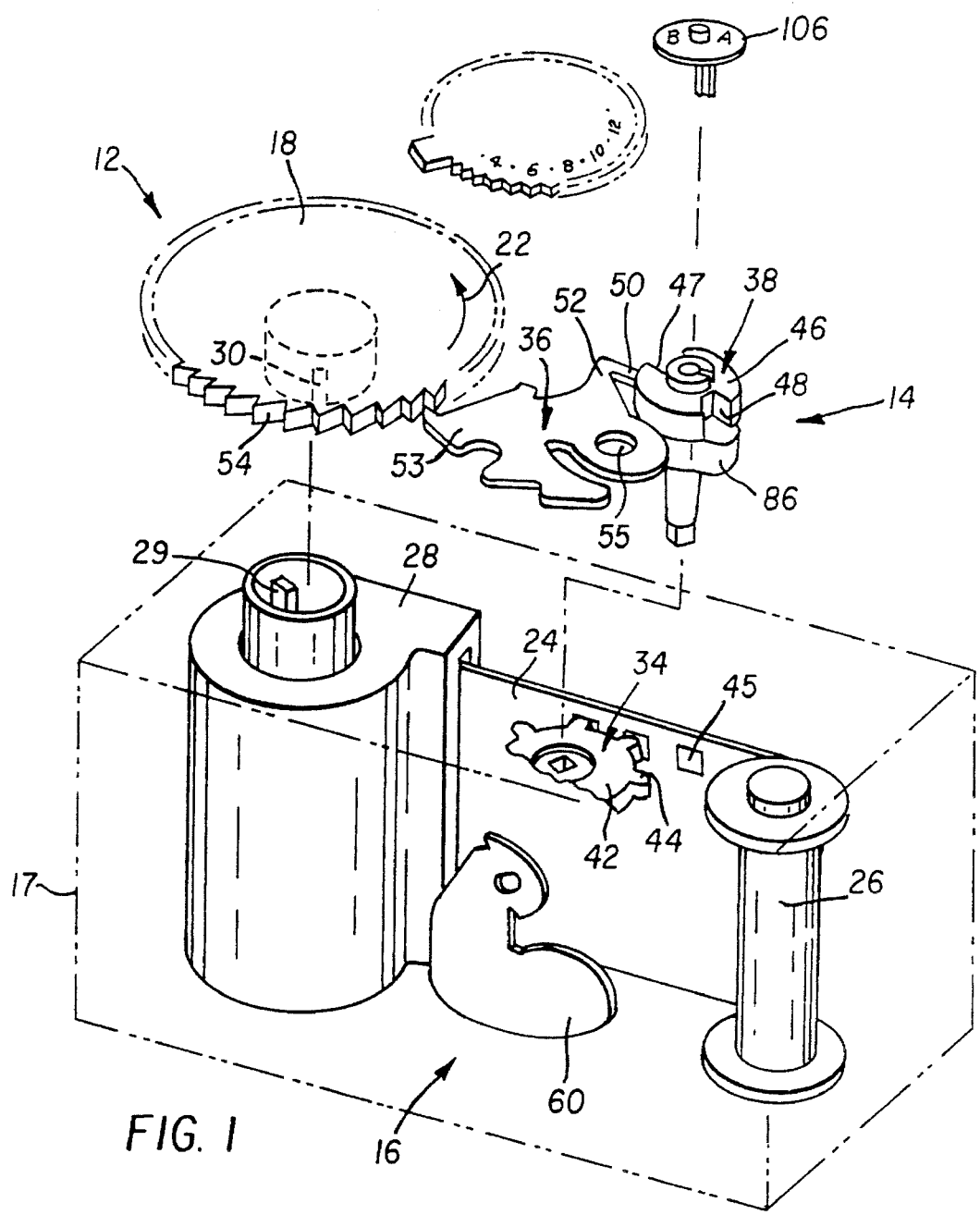
FIG. 1 is an exploded view of a camera film metering mechanism in accordance with a preferred embodiment of the invention.
Figure 2:
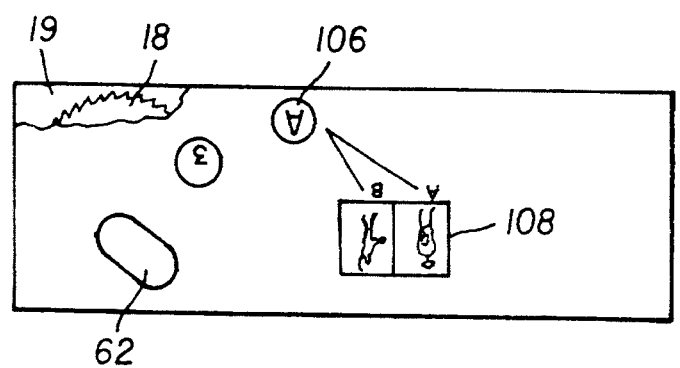
FIG. 2 is a top view of the camera of FIG. 1, showing indicia visible from the camera exterior in accordance with one feature of the preferred embodiment.
Figure 3:
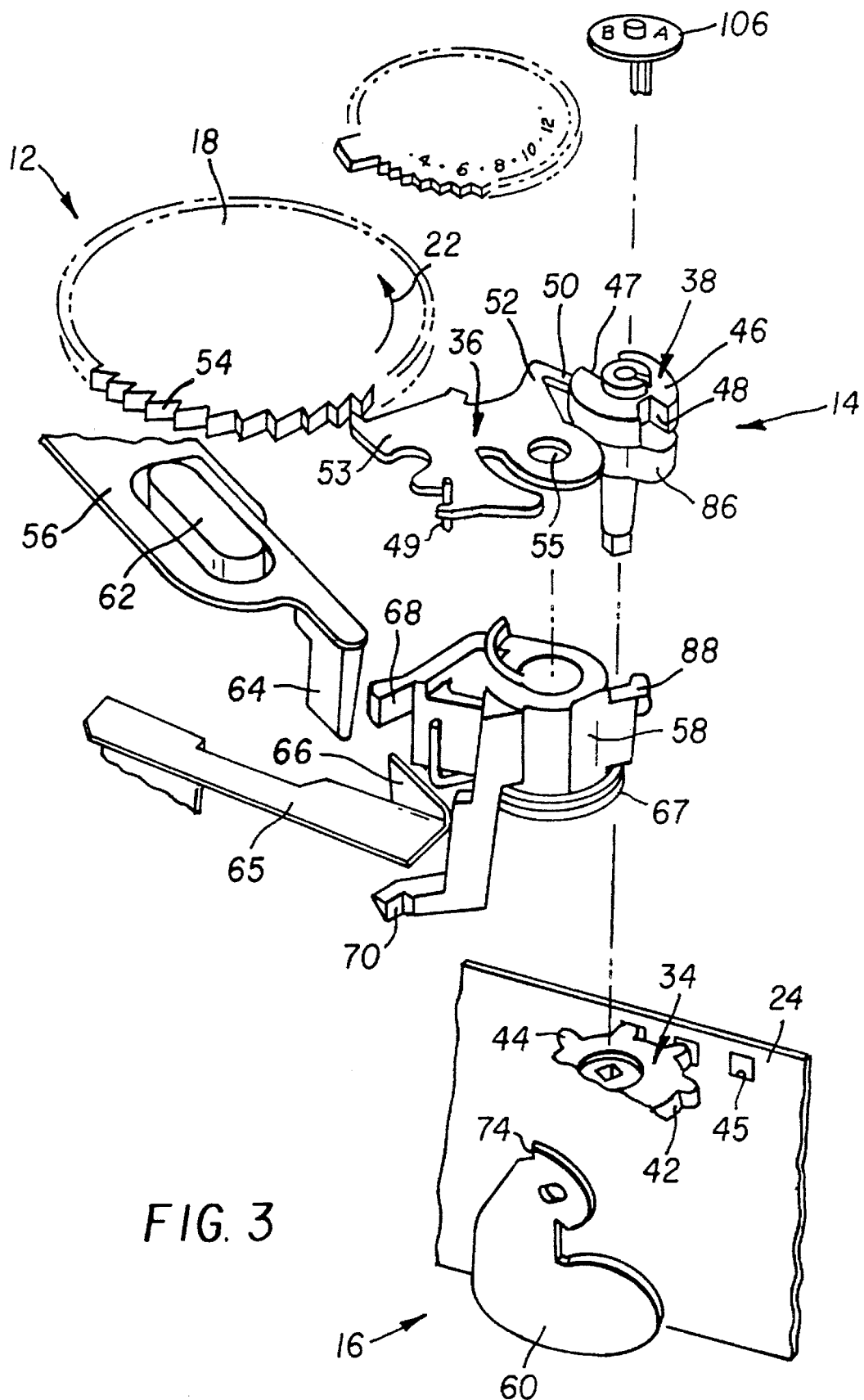
FIG. 3 is a is an exploded view corresponding to FIG. 1, with additional camera elements that work with the film metering mechanism.
Figure 4:
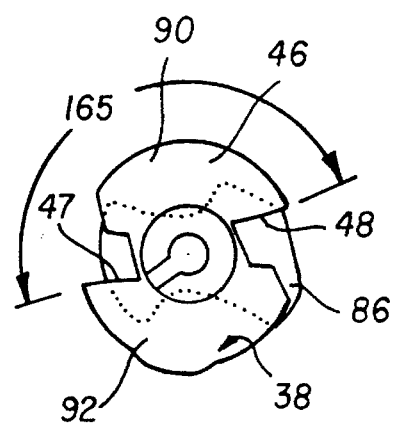
FIGS. 4 and 5 are top and bottom views, respectively, of a film metering cam in accordance with the preferred embodiment.
Figure 5:
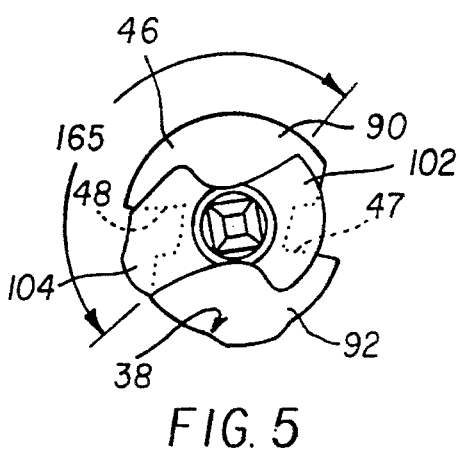

Referring now to the drawings, and beginning with FIGS. 1–3, camera mechanisms are depicted for use with the invention, including a film advancing mechanism 12, a film metering mechanism 14, and an exposure mechanism 16. All are enclosed within a camera casing 17, with various elements accessible or visible from outside the casing as will be described.

The film advancing mechanism 12 includes a thumb wheel 18 accessible for rotation by the camera operator adjacent a top corner 19 (FIG. 2) of casing 17. Counter clockwise rotation, as indicted at 22 in FIG. 1, pulls the film 24 from a supply chamber 26 into film cartridge 28. The film and cartridge are a standard 35 mm format including an internal spool portion 29 adapted to mate with driving members 30 on the thumb wheel. Rotation of the wheel turns the spool and advances the film. Further details are disclosed, for example, in U.S. Pat. No. 5,235,366, issued Aug. 10, 1993.

The film metering mechanism 14 comprises sprocket 34, metering lever 36 and control element 38.

Sprocket 34 includes a hub 42 with eight projections 44 that engage and extend into perforations 45 along an edge of the film 24. The perforations are arranged according to the standard 35 mm format, with a pitch of eight perforations between standard full 35 mm exposure frames. The sprocket projections 44 are designed with a circumferencial pitch equal to the distance between the film perforations. When the film advancing mechanism 12 moves the film from the supply chamber 26 toward the cartridge 28, engagement between the film perforations 45 and sprocket projections 44 drives the sprocket in a counterclockwise direction (FIG. 1), rotating the sprocket one eighth of a revolution for each film perforation.

Although the term "film frame" is used in this specification in reference to an area that is exposed on the film, there is no visible frame until the film is developed. The position of the frame is determined by the metering mechanism. Its area is a function of the camera structure that defines the edges of the image projected onto the film. The film is the same whether used for full frame exposures in conventional cameras or half-frame exposures according to the present invention.

One complete revolution of the sprocket 34 corresponds to the normal 35 mm full pitch between adjacent exposures frames. According to the present invention, however, the metering control element 38 is designed for half-frame exposures, and two half-frame exposures are made with each full rotation of the sprocket.

Control element 38 is a cam 46 that is secured to and rotates with the sprocket 34. Again, although the cam 46 can be exchanged with corresponding parts in full frame cameras, the cam is designed according to the present invention to control two half-frame exposures during each complete revolution. For this purpose the cam is provided with first and second notches, 47 and 48.

Metering lever 36 is mounted for pivotal movement biased clockwise by spring 49 (FIG. 3). A hook 50 on an arm 52 of the metering lever engages and follows the surface of cam 46. When one of the notches 47 or 48 rotates into alignment with hook 50, the hook drops into the notch, rotating the metering lever 36 clockwise, and moving an oppositely extending arm 53 into engagement with the thumb wheel 18. The thumb wheel 18 includes serrations or teeth 54 around its outer peripheral edge. The center of rotation 55, of metering lever 36, is positioned so the square corner of arm 53 engages the teeth like a ratchet, preventing further rotation of the wheel in the film advancing direction. Further film movement is thereby arrested when the film is properly positioned for the next exposure.

Exposure mechanism 16 includes an exposure initiation member 56 (FIG. 3), a high energy member 58, and a shutter 60.

The exposure initiation member is a resilient part coupled to the camera core and including a button 62 and nose 64, both on a flexible arm. The button is depressable against the resilient bias of the arm to move the nose 64 into engagement with a flexible member 65, pushing the flexible member down and releasing a latch 66 from a latching position holding the high energy member.

The high energy member 58 is mounted to pivot about a vertical axis and is urged by a high energy spring 67 to rotate counterclockwise, or to the right in FIG. 3. The member 58 includes a latching abutment 68 on one end and a lever 70 at the other end. The latching abutment cooperates with latch 66 on flexible member 65, holding the high energy member 58 in a latched or set position until released by depression of button 62. When the member 58 is released, lever 70, at the other end of member 58, moves rapidly into striking engagement with a shutter abutment 74, driving the shutter clockwise, and exposing the film. The exposure cycle is completed when the shutter returns to its original position under the influence of a spring, not shown.

The high energy member 58 and spring 67 continue to rotate counterclockwise, pivoting the metering lever 36 out of notch 47 or 48, disengaging hook 50, and releasing ratchet arm 53 from engagement with the thumb wheel 18. The metering mechanism is thus released and ready to meter film movement for the next successive exposure frame.

After the exposure, the film is advanced to position the next frame in the exposure position. Movement of the film again drives sprocket 34 and a second cam 86 secured to the sprocket 34 coaxial with cam 46. The second cam engages an extension 88 of the high energy lever and rotates the lever, returning it to its latched position with abutment 68 behind latch 66.

Referring now more specifically to FIGS. 4–7, the configuration of cams 46 and 86 is depicted (FIGS. 4 and 5), along with the resulting film exposure frames (FIG. 6), and corresponding pictures (FIG. 7) processed and printed from the exposed film.

Figure 6:
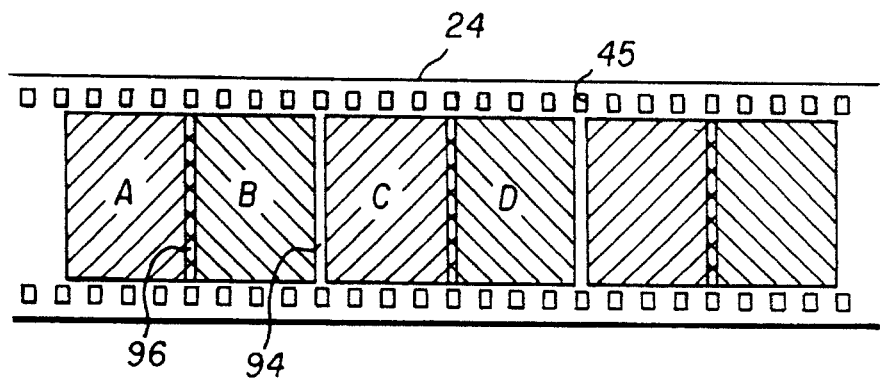
FIG. 6 is a top view of a film strip depicting exposure frames in spaced pairs according to the preferred embodiment.
Figure 7:
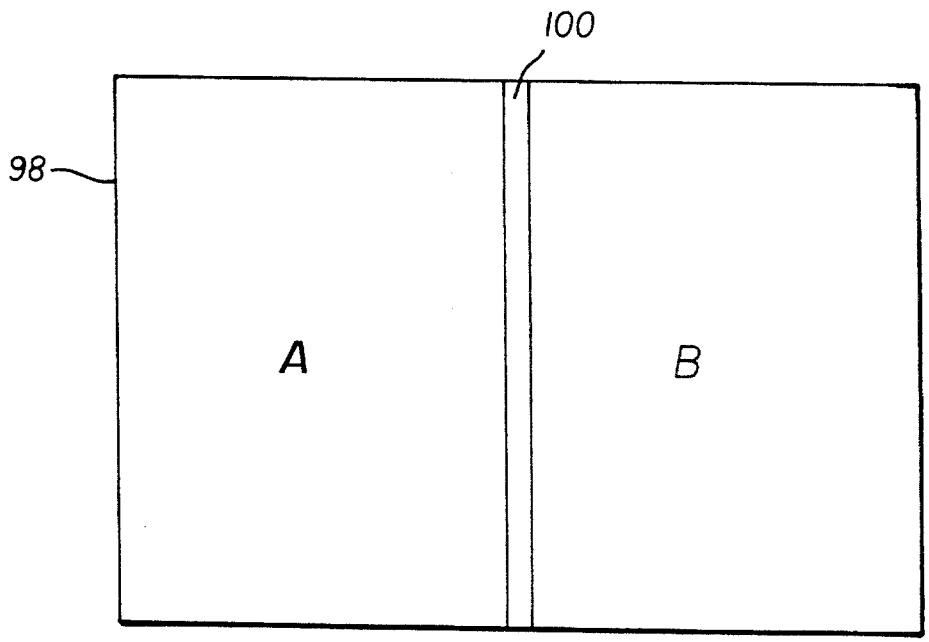
FIG. 7 is a top view of a photographic print produced from the film strip of FIG. 6.

Metering cam 46 controls longitudinal movement of the film between successive frames alternately to advance the film a first distance and a second distance greater than the first distance. The first and second distances are determined by opposed asymmetric lobes 90 and 92, and previously mentioned notches 47 and 48. Lobe 90 determines a first angular distance of one hundred and sixty five degrees (165°) between notches 47 and 48 producing an overlapping pair of exposure frames "A" and "B" (FIG. 6). Lobe 92 determines a second greater angular distance of one hundred and ninety five degrees (195°) between notches 48 and 47 producing a space 94 between adjacent pairs of esposure frames. The exposure frames in a pair overlap slightly along one edge 96, and the pair of frames occupies the same area as a standard full frame 35 mm exposure. The space 94 between adjacent pairs also is the same as the 35 mm standard. When the exposure frames are printed, standard equipment and procedures are used and the print 98 is cut as depicted in FIG. 7 with two half-frame exposures "A" and "B" within the same area as a standard 35 mm print. The overlap 100, exaggerated in FIG. 7, identifies the interface between adjacent half-frame pictures, and can be used as a guide for the photographer to separate the paired pictures, if so desired.

Resetting cam 86 also includes opposed asymmetric lobes 102 and 104, determining angles of one hundred sixty five degrees (165°) and one hundred ninety five degrees (195°), corresponding to the metering lobes 90 and 92. Lobes 102 and 104 reset the metering lever after each half-frame exposure as described above.

According to this preferred embodiment, an indicator 106 (FIGS. 1 and 3) is provided at a location visible from outside said camera for indicating whether the next exposure frame is the first or second frame in one of exposure pairs. Appropriate graphics 108 may be associated with the indicator.

Figure 8:
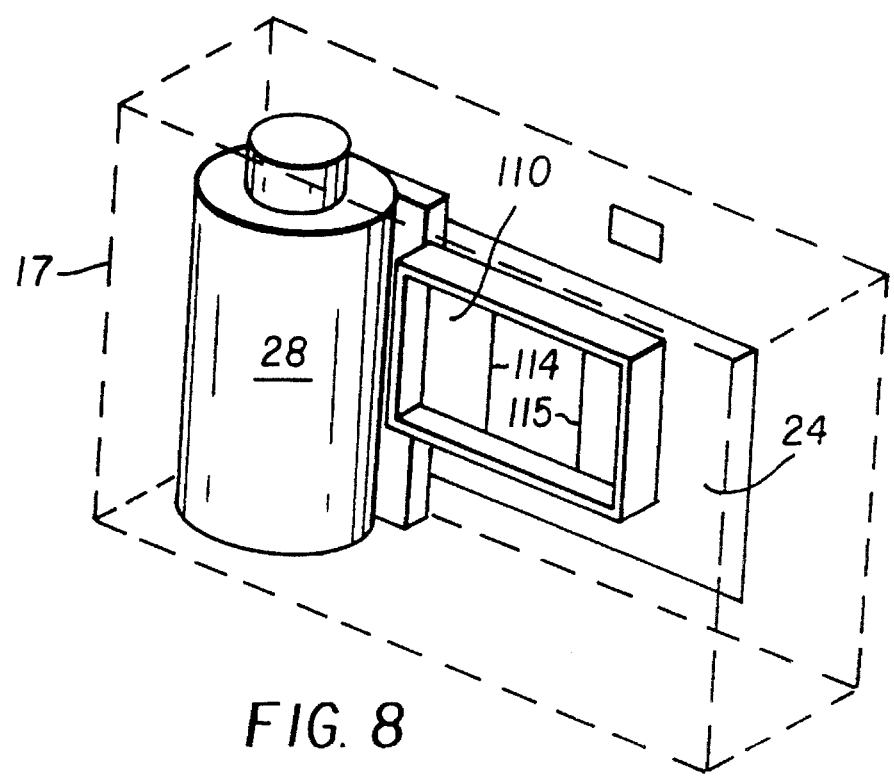
FIG. 8 is a perspective view illustrating an exposure mask for use with the camera of FIG. 1 according to the preferred embodiment.
Figure 9:
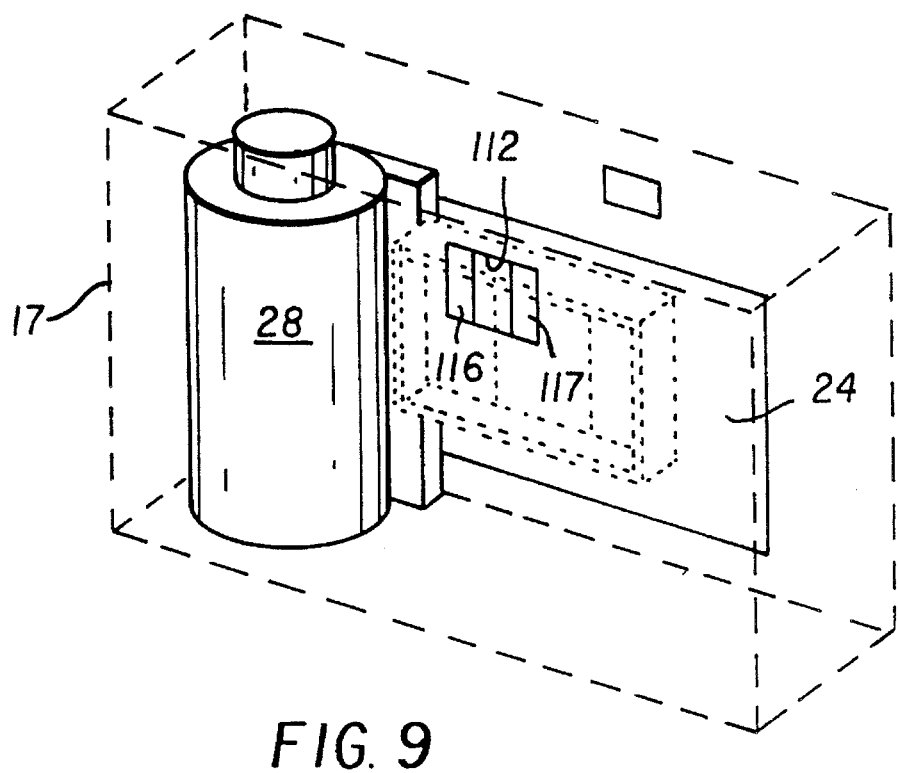
FIG. 9 is a perspective view illustrating a viewfinder mask for use with the camera of FIG. 1 according to the preferred embodiment.

FIGS. 8 and 9 depict exposure and viewfinder masks 110 and 112, respectively, adapted to mate with the structure of a full frame camera for converting it to take half-frame exposures. Mask 110 includes framing elements 114 and 115 that define between them the proper width of the half-frame esposure. Mask 112 includes corresponding opaque pieces 116 and 117 that define the corresponding field of view for aligning the camera with the intended scene.

It should now be apparent that existing full frame cameras can be converted during manufacture to provide for half-frame exposures with only a few different parts. The half-frame metering cam 46 is substituted for the usual full frame cam, and exposure and viewfinder masks 110 and 112 are added. If desired, additional indicators 106 also can be provided. The half-frame camera thus takes advantage for almost all of its parts of the very high manufacturing volumes associated with the full frame version. The same is true of the film and its processing and printing, where the half-frame exposures use the same equipment and procedures as the full frame exposures.

While the invention is described in connection with a preferred embodiment, other modifications and applications will occur to those skilled in the art. The claims should be interpreted to fairly cover all such modifications and applications within the true spirit and scope of the invention.

PARTS LIST FOR FIGURES

| Reference No. | Part |
| --- | --- |
| 12. | Film advancing mechanism. |
| 14. | Film metering mechanism. |
| 16. | Exposure mechanism. |

-continued

| Reference No. | Part |
| --- | --- |
| 17. | Camera casing. |
| 18. | Thumb wheel. |
| 19. | Top corner. |
| 22. | Counterclockwise direction. |
| 24. | Film. |
| 26. | Film supply chamber. |
| 28. | Film cartridge. |
| 29. | Spool portion. |
| 30. | Driving members. |
| 32. | Exposure position. |
| 34. | Metering sprocket. |
| 36. | Metering lever. |
| 38. | Metering control element. |
| 40. | Anti-backup mechanism. |
| 42. | Hub. |
| 44. | Projections. |
| 45. | Perforations. |
| 46. | Cam. |
| 47 & 48. | First and second notches. |
| 48. | Spring. |
| 50. | Hook. |
| 52. | Arm. |
| 53. | Ratchet arm. |
| 54. | Teeth. |
| 55. | Center of rotation. |
| 56. | Exposure initiation member. |
| 58. | High energy lever. |
| 60. | Shutter. |
| 62. | Button. |
| 64. | Nose. |
| 65. | Flexible member. |
| 66. | Latch. |
| 67. | High energy spring. |
| 68. | Latching abutment. |
| 70. | Lever. |
| 74. | Shutter abutment. |
| 86. | Second cam. |
| 88. | Extension follower. |
| 90. | Cam lobe. |
| 92. | Cam lobe. |
| 94. | Space. |
| 96. | Edge. |
| 98. | Print. |
| 100. | Overlap. |
| 102. | Cam lobe. |
| 104. | Cam lobe. |
| 106. | Indicator. |
| 108. | Graphics. |
| 110. | Mask. |
| 112. | Mask. |
| 114. | Framing element. |
| 115. | Framing element. |
| 116. | Framing element. |
| 117. | Framing element. |

What is claimed is:

1. A camera including a metering mechanism for controlling relative longitudinal positions of successive frames exposed on photographic film; characterized in that:
   the metering mechanism includes an element controlling longitudinal film movement between said successive frames to advance the film alternating between a first distance and a second distance greater than said first distance, said first distance defining pairs of adjacent frames and said second distance defining a space between adjacent pairs of said frames.

2. The invention of claim 1, wherein said controlling element is a cam driven by said film movement, said cam including a first section defining said first distance and a second longer section defining said second distance.

3. The invention of claim 1, wherein said controlling element is a circular cam driven by said film movement, said cam including opposed asymmetric lobes, one defining said first distance and the other defining said second distance.

4. The invention of claim 3, including a second cam, coaxial with said first cam, and including opposed asymmetric lobes for latching an exposure member against a bias concurrently with said film metering.

5. The invention of claim 3, including an indicator visible from outside said camera for indicating whether the next exposure frame is first or second in one of said pairs.

6. The invention of claim 1, wherein adjacent exposure frames in said pairs overlap along their adjacent edge.

7. The invention of claim 1, wherein said pair of frames together define a size equal to a standard 35 mm exposure, and said space equals the space between standard 35 mm exposures.

8. The invention of claim 1, wherein said camera includes an exposure box and viewfinder appropriate for standard 35 mm images, and masks are applied to said box and said viewfinder to reduce their size proportionally for half-frame exposures.

* * * * *